United States Patent
Beek

(10) Patent No.: US 10,626,263 B2
(45) Date of Patent: *Apr. 21, 2020

(54) PEROXIDE MASTERBATCH

(71) Applicant: Nouryon Chemicals International B.V., Arnhem (NL)

(72) Inventor: Waldo Joseph Elisabeth Beek, Deventer (NL)

(73) Assignee: Nouryon Chemicals International B.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/463,034

(22) PCT Filed: Nov. 21, 2017

(86) PCT No.: PCT/EP2017/079837
§ 371 (c)(1),
(2) Date: May 22, 2019

(87) PCT Pub. No.: WO2018/095878
PCT Pub. Date: May 31, 2018

(65) Prior Publication Data
US 2019/0276652 A1    Sep. 12, 2019

(30) Foreign Application Priority Data
Nov. 25, 2016 (EP) ..................... 16200723

(51) Int. Cl.
| | | |
|---|---|---|
| C08L 23/16 | (2006.01) | |
| C08F 210/16 | (2006.01) | |
| C08J 3/22 | (2006.01) | |
| C08J 3/24 | (2006.01) | |
| C08K 3/26 | (2006.01) | |
| C08K 3/36 | (2006.01) | |
| C08L 23/20 | (2006.01) | |
| C08K 5/14 | (2006.01) | |
| C08K 3/01 | (2018.01) | |
| C08K 3/30 | (2006.01) | |
| C08L 33/08 | (2006.01) | |
| C08K 3/34 | (2006.01) | |
| C08K 3/04 | (2006.01) | |
| C08L 9/06 | (2006.01) | |

(52) U.S. Cl.
CPC ............ *C08L 23/16* (2013.01); *C08F 210/16* (2013.01); *C08J 3/226* (2013.01); *C08J 3/24* (2013.01); *C08K 3/01* (2018.01); *C08K 3/26* (2013.01); *C08K 3/36* (2013.01); *C08K 5/14* (2013.01); *C08L 23/20* (2013.01); *C08J 2323/16* (2013.01); *C08J 2423/08* (2013.01); *C08J 2423/14* (2013.01); *C08K 3/04* (2013.01); *C08K 3/30* (2013.01); *C08K 3/346* (2013.01); *C08K 2003/265* (2013.01); *C08K 2003/3045* (2013.01); *C08K 2201/006* (2013.01); *C08K 2201/014* (2013.01); *C08L 9/06* (2013.01); *C08L 33/08* (2013.01); *C08L 2205/025* (2013.01); *C08L 2310/00* (2013.01); *C08L 2312/00* (2013.01)

(58) Field of Classification Search
CPC .......... C08L 23/16; C08L 23/20; C08K 5/14; C08K 3/013; C08K 3/04; C08K 3/30; C08K 3/346; C08K 3/36; C08K 3/26; C08J 3/22

See application file for complete search history.

(56) References Cited

FOREIGN PATENT DOCUMENTS

| WO | 01/04200 A1 | 1/2001 |
| WO | 2012/068703 A1 | 5/2012 |
| WO | 2018/095879 A1 | 5/2018 |

OTHER PUBLICATIONS

Shiraishi Omya Gmbh: "Product Information Hakuenha CCR-S10," Jan. 12, 2012, Retrieved from the Internet on May 4, 2017, URL:https://www.omya.com/Documents/SOG/HakuenkaCCRS10.pdf, XP055369490.

European Search Report issued in the counterpart European Application No. 16200723.1 dated May 12, 2017.

Notification of Transmittal of the International Search Report and the Written Opinion of the International Searching Authority, or the Declaration from the International Bureau of WIPO for International Application No. PCT/EP2017/079837 dated Mar. 21, 2018.

*Primary Examiner* — Peter D. Mulcahy
(74) *Attorney, Agent, or Firm* — Lorenz & Kopf, LLP

(57) ABSTRACT

Peroxide masterbatch comprising: —15-55 wt % of one or more organic peroxides, —15-45 wt % of one or more copolymers of at least two different monomers, the first monomer being ethylene or propylene, the second monomer being a vinyl monomer comprising at least four carbon atoms and optionally heteroatoms, —6-70 wt % of at least two filler types—filler type 1 and filler type 2—each having a different BET surface area: (i) filler type 1 being present in the masterbatch in a concentration of 3-30 wt % and having a BET surface area of more than 100 $m^2/g$; (ii) filler type 2 being present in the masterbatch in a concentration of 3-40 wt % and having a BET surface area of 100 $m^2/g$ or less; wherein the masterbatch has the form of extrudates.

16 Claims, No Drawings

PEROXIDE MASTERBATCH

This application is a national stage filing under 35 U.S.C. § 371 of PCT/EP2017/079837, filed Nov. 21, 2017, which claims priority to European Patent Application No. 16200723.1, filed Nov. 25, 2016, the contents of which are each incorporated herein by reference in their entireties.

The present invention relates to a peroxide masterbatch, its preparation and use in the crosslinking and modification of polymers.

Elastomers, including thermoplastics, elastomeric thermoplastics, polyolefins, and rubbers, such as polyethylene, ethylene-vinyl acetate copolymer, ethylene-propylene copolymer (EPM), ethylene-octene copolymer (POE), ethylene-propylene diene rubber (EPDM), and butadiene-acrylonitrile copolymer, are all generally low-priced, widely available, and have excellent physical properties that allow wide-range usage. Upon treatment with organic peroxides, elastomers can be crosslinked or their melt properties can be modified, for instance by degradation or by creating long chain branches.

Safety considerations generally do not allow pure organic peroxide in the crosslinking or modification process. Furthermore, it is very difficult to obtain a homogeneous distribution of pure peroxide in the elastomer, considering the small amount of peroxide that is required for efficient crosslinking. An inhomogeneous distribution leads to an inhomogeneous product, which is evidently undesired.

Instead of pure peroxide, diluted forms of organic peroxide are generally used. Examples of such diluted forms are powder mixtures of peroxides in inert fillers and so-called masterbatches, in which the peroxide is dispersed in a polymeric matrix.

Compared to powdery formulations, masterbatches require less time to homogenously disperse in the elastomer and can be handled without dust being formed.

Conventional masterbatches are based on ethylene propylene copolymer (EPM) or ethylene propylene diene copolymer (EPDM) and are prepared using an internal mixer or open two-roll mill, followed by calendering and shaping the masterbatch using a granulator. This is a two or three step procedure that is labour intensive and not very cost effective.

Extrusion would be a far less labour intensive and more cost efficient manner of preparing masterbatches. Unfortunately, however, extrusion is not used in commercial practice since suitable EPM and EPDM resins are only available in bales; not in granular or pellet form. Bales cannot be added to an extruder and milling EP(D)M bales to sizes suitable to feed to an extruder is not economically attractive since the resized/milled EP(D)M will easily cake, thereby limiting its use to short time frames. And although this problem can be limited to some extent by adding an anti-caking agent, this not only increases the costs of the masterbatch, it may also make the masterbatch unsuitable for certain applications.

The object of the present invention is therefore the provision of an extrusion process for the preparation of a peroxide masterbatch and the provision of a peroxide masterbatch in the form of extrudates.

A further object is the provision of a masterbatch suitable for dispersing in elastomers, in particular in EPM and EPDM.

This object has been achieved by the provision of a masterbatch comprising:

15-55 wt % of one or more organic peroxides,
15-45 wt % of one or more copolymers of at least two different monomers, the first monomer being ethylene or propylene, the second monomer being a vinyl monomer comprising at least four carbon atoms and optionally heteroatoms,
6-70 wt % of at least two types of fillers—filler type 1 and filler type 2—each having a different BET surface area:
 (i) filler type 1 being present in the masterbatch in a concentration of 3-30 wt % and having a BET surface area of more than 100 $m^2/g$;
 (ii) filler type 2 being present in the masterbatch in a concentration of 3-40 wt % and having a BET surface area of 100 $m^2/g$ or less;
wherein the masterbatch has the form of extrudates.

These masterbatches can be produced by feeding the one or more peroxides, granules or pellets of the one or more copolymers, and the at least two fillers to an extruder and extruding the combination to produce an intimate mixture of the components.

The masterbatch has the form of extrudates, which means that they have been prepared by extrusion, generally followed by cutting or granulating the strand or strip coming out of the extruder die.

The total amount of organic peroxide present in the masterbatch is 15-55 wt % preferably 30-52 wt %, more preferably 35-50 wt %, and most preferably 35-45 wt %, based on the total weight of the masterbatch.

Examples of suitable organic peroxides are dicumyl peroxide, di(tert-butylperoxyisopropyl)benzene, 1,1-di(tert-butylperoxy)-3,3,5-trimethyl-cyclo-hexane, butyl 4,4-di(tert-butylperoxy)valerate, 2,5-dimethyl-2,5-di(tert-butylperoxy)hexane, 2,5-dimethyl-2,5-di(tert-butylperoxy)hexyne-3, tert-butyl peroxybenzoate, tert-butylperoxy 2-ethylhexyl carbonate, 3,6,9-triethyl-3,6,9-trimethyl-1,4,7-triperoxonane, tert-butylperoxy-3,5,5-trimethylhexanoate, and mixtures thereof.

Preferred peroxides are dicumyl peroxide, di(tert-butylperoxyisopropyl)benzene, 1,1-di(tert-butylperoxy)-3,3,5-trimethylcyclohexane, butyl-4,4-di(tert-butyl-peroxy)valerate, 2,5-dimethyl-2,5-di(tert-butylperoxy)hexane, and tert-butyl peroxy-3,5,5-trimethylhexanoate.

The total amount of copolymer present in the masterbatch is of 15-45 wt %, more preferably 20-40 wt %, and most preferably 25-35 wt %, based on the total weight of the masterbatch.

The copolymer preferably has a melt flow index (MFI; measured at 190° C., 2.16 kg; ASTM D1238) of 1 g/10 min or less. This allows for the production of strong extrudate strands, which can be readily chopped after cooling in a water bath.

Examples of suitable copolymers for the masterbatch according to the present invention are ethylene-vinyl acetate copolymer, copolymers of (i) ethylene or propylene and (ii) 1-butene, 1-hexene, and/or 1-octene, copolymers of ethylene and an acrylate, styrene ethylene butylene hydrogenated copolymers, styrene ethylene propylene hydrogenated copolymers.

In a preferred embodiment, the copolymer is an ethylene vinyl acetate copolymer or a copolymer of (i) ethylene or propylene and (ii) 1-butene or 1-octene. Even more preferred are copolymers of (i) ethylene or propylene and (ii) 1-butene or 1-octene. Such copolymers are generally referred to as polyolefin elastomers (POE). They are generally prepared by metallocene catalysis. These copolymers are semi-crystalline, containing both an amorphous and a crystalline phase, which phases can be either randomly distributed or in block conformation.

POEs are commercially available as free-flowing pellets. Examples of suitable POEs are Engage™ polyolefin elastomers (ex-Dow), TAFMER™ series DF, A, and XM (ex-Mitsui), Queo™ plastomers (ex Borealis) and Exact™ plastomers (ex-ExxonMobil).

The masterbatch contains 6-70 wt %, preferably 13-45 wt %, and most preferably 22-37 wt % of at least two fillers with different BET surface areas: filler type 1 and filler type 2.

Filler type 1 represents so-called reinforcing fillers, which serve to absorb the peroxide, assist in dispersing the peroxide in the elastomer, and prevent bleeding of the peroxide out of the masterbatch. These fillers also influence the hardness of the extrudate, its caking resistance, and its ease of dispersing into a polymer.

Filler type 1 has a BET surface area of more than 100 $m^2/g$, preferably more than 110 $m^2/g$, and most preferably more than 120 $m^2/g$. The BET surface area refers to the surface area measured by nitrogen adsorption according to the well-known Brunauer-Emmett-Teller method.

Examples of suitable materials that can be used as filler type 1 are silica, carbon black, and combinations thereof. Silica is the preferred material.

The amount of filler type 1 present in the masterbatch is 3-30 wt %, more preferably 3-15 wt %, and most preferably 7-12 wt %, based on the total weight of the masterbatch.

Filler type 2, with its limited surface area, includes so-called non-reinforcing fillers and semi-reinforcing fillers. Filler type 2 serves to enhance production output, lower the costs, and enhance thermal conductivity, thereby allowing lower operating temperatures. The latter is important in safely processing organic peroxides.

These low surface area fillers are generally cheaper than reinforcing fillers of type 1. They are also less abrasive and therefore reduce friction and wear inside the extruder. They are also denser than the high surface area fillers, which facilitates easy dosing and low energy compaction. In addition, their thermal expansion is lower, which reduces the volume of the polymer melt. Under constant processing conditions, this leads to a lower melt pressure as well as to a lower screw drive torque. As a consequence, the screw speed can be increased, and thereby the output can be increased.

In addition, their thermal conductivity is high, which results in fast distribution of thermal energy through the polymer melt, thereby speeding up the melting of the polymer during extrusion and the cooling down afterwards. This also facilitates a more homogeneous melt, with less local hot spots, resulting in a more uniform melt viscosity.

Filler type 2 has a BET surface area below 100 $m^2/g$, preferably below 50 $m^2/g$, and most preferably below 10 $m^2/g$.

Examples of suitable materials that can be used as filler type 2 include calcium carbonate, clays, barium sulphate, and combinations thereof. The preferred material is calcium carbonate.

The amount of filler type 2 present in the masterbatch is 3-40 wt %, more preferably 10-30 wt %, and most preferably 15-25 wt %, based on the total weight of the masterbatch.

The masterbatch of the present invention may further contain one or more adjuvants selected from the group of antioxidants, scorch retarders, UV stabilizers, flame retardants, pigments, dyes, processing oils, lubricants, blowing agents (e.g azo-dicarbonamide or gas-filled thermoplastic microspheres, e.g. Expancel®), and other additives that are commonly used in elastomers. These products are to be used in the conventional amounts, provided that they do not adversely affect the performance and storage stability of the masterbatch. Typically, they constitute 5 wt % or less of the total masterbatch.

The masterbatch according to the present invention is prepared by extrusion. In a preferred embodiment, a twin screw extruder is used.

The copolymer(s) is/are added, in granular or pellet form, to the extruder. Preferably, the copolymer(s) is/are added as free-flowing pellets or granules.

The temperature of the extruder is controlled in the range 50-95° C., more preferably 60-90° C., and most preferably 70-85° C. If the organic peroxide is solid at room temperature, the extrusion temperature is preferably above the melting temperature of the peroxide, thereby allowing the peroxide to absorb on the filler(s). If the extruder is heated to temperatures above 95° C., safe extrusion of peroxides becomes questionable.

In one embodiment, all ingredients of the masterbatch are added simultaneously via the main extruder feed. If all ingredients are of similar size and shape, a single feeder can be used. In another embodiment, the copolymer pellets or granules are dosed via a separate feeder in the same feed zone. In a further embodiment, the copolymer(s) is/are added via a first feeder, the peroxide(s) is/are added via a second feeder, and the fillers are added via a third and optionally a fourth feeder, all in the same feed zone, or in separate feed zones.

The peroxide can be added to the extruder as such, or in diluted form. It can be diluted in a solvent or admixed or absorbed on a solid diluent. If the peroxide or its dilution is in a liquid state upon addition to the extruder, a liquid dosing system (e.g. a pump) can be used to add it to the extruder. The peroxide can be added in the same feed zone as the one or more of the other ingredients, or it can be added in a more downstream feed zone.

Dilution of the peroxide with a solid diluent can be done by simply admixing the peroxide and the diluent, provided that the peroxide is solid at room temperature. If the peroxide is liquid at room temperature, the peroxide may be sprayed on the solid diluent. It is also possible to first melt a solid peroxide and then spray it on the solid diluent. As solid diluent, fillers of type 1 and/or type 2 can be used.

The screw speed of the extruder generally varies from 50 to 250 rpm. The ingredients are preferably fed to the extruder with a rate that results in under-feeding of the screws. This prevents the build-up of ingredients inside the barrel.

After extrusion, the strands or strips leaving the extruder die are preferably cooled down as fast as possible; this will prevent "sweating" of the peroxide and will aid the cutting or granulation of the extruded strand/strip.

Cooling of the extrudate can be performed in a water bath, but is preferably performed by using a stream of (cooled) air. If a water bath is used, the chopped extrudates need to be dried using dry or cold air in order to prevent caking of the resulting particles during this drying process.

The extrudates preferably have a cylindrical dimension with a diameter of 1-10 mm and length of 3-20 mm, more preferably a diameter of 1-5 mm and length of 3-5 mm, and most preferably a diameter of 1-3 mm and length of 3-5 mm. The extrudates may also have other shapes, such as a cubical shape.

The masterbatch of the present invention is suitable for various applications that involve the treatment of a polymer with an organic peroxide.

One particularly preferred application is cross-linking of elastomers—including thermoplastics, elastomeric thermoplastics, polyolefins, and rubbers—such as EPM, EPDM, ethylene-vinyl acetate copolymer, natural rubber, polybutadiene, polyisoprene, polybutylene, polyisobutylene, polyacrylic acid ester, styrene-butadiene copolymer, acrylonitrile-butadiene copolymer, hydrogenated acrylonitrile-butadiene copolymer, acrylonitrile-butadiene-styrene terpolymer, fluorinated rubber, silicone rubber, urethane rubber, polyethylene, ethylene-α-olefine copolymer, and chlorinated polyethylene.

Its use for the crosslinking of EPM and EPDM is particularly preferred. The masterbatch according to the present invention can be homogeneously dispersed in EPM and EPDM in very short time frame, thereby allowing fast processing times.

The masterbatch of the present invention is typically used in amount of 0.2-20% by weight, more preferably 1-10% by weight, relative to the weight of the elastomer to be crosslinked.

Crosslinking of the elastomer may be carried out using any conventional process. In such processes the elastomer to be crosslinked typically is first homogeneously mixed with an inactive filler such as talc and calcium carbonate, and/or carbon black, and a processing oil, and then mixed or kneaded with the required amount of the masterbatch. Suitable mixing equipment includes Banburry type internal mixers. Due to the elastomer viscosity and friction caused by the fillers, the temperature inside the mixer will rise rapidly. In order to avoid premature crosslinking, the peroxide masterbatch is added near the end of the mixing cycle. The downside thereof is that there is only limited mixing time available for the peroxide masterbatch. This illustrates the importance of masterbatches that quickly and homogeneously disperse in the elastomer.

In the subsequent cross-linking step the mixture is typically heated to 140-200° C. for 5-30 minutes in a mould.

Other applications for the masterbatch according to the present invention include the crosslinking of polyethylene, the functionalization of polyethylene or polypropylene, the modification polyethylene to increase long chain branching, the degradation of polypropylene, and the production of thermoplastic vulcanisates (TPV). The latter involves the combined crosslinking of EPDM and limited degradation of polypropylene. The quick dispersion of the inventive masterbatches into EPDM allows for a better balance between crosslinking and degradation.

EXAMPLES

Example 1

Two masterbatches according to the invention were prepared. The first masterbatch contained dicumyl peroxide (Perkadox® BC, ex-AkzoNobel); the second masterbatch contained di(tert-butylperoxyisopropyl)benzene (Perkadox® 14S, ex-AkzoNobel).

The copolymer used was a POE copolymer of ethylene and 1-octene (Engage™ 8180 ex-Dow). Filler type 1 was silica with a BET surface area of 125 m²/g. Filler type 2 was CaCO$_3$ with a BET surface area of 5 m²/g.

These masterbatches were prepared by extrusion, using a barrel temperature of 75° C. and a screw speed of 100 rpm. After extrusion, the produced string was cooled and chopped to granules.

A similar, but comparative masterbatch was prepared on a two-roll mill. The temperature of the front roll ranged from 60° C. at the start to 50° C. during production. The temperature of the back roll ranged from 75° C. at the start to 70° C. during production. The nip setting was 1 mm, leading to 4 mm thick sheets after cooling. After cooling and resting for one week, sheets were cut into 10×8×4 mm pieces.

The resulting masterbatches were tested for their dispersion behaviour in EPDM. This behaviour was compared with that of two commercial AkzoNobel masterbatches containing the same peroxides, but based on EPM and being prepared using a two roll mill instead of an extruder: Perkadox® BC-40 MB-GR and Perkadox® 14-40 MB-GR-S.

The dispersion behaviour was tested by mixing, on a two-roll mill at 60° C., 100 weight parts of EPDM (Dutral® 4044, ex-Versalis), 70 parts by weight carbon black N-550 and 70 parts by weight of carbon black N-772 (both ex-Cabot), 70 parts by weight processing oil (Catanex D 579, ex-Shell), and 10 parts by weight of the masterbatches.

The carbon/EPDM system was black coloured; the masterbatch was white. Hence, the dispersion of the masterbatch in the rubber could be observed by visual inspection. The mixing time required to reach visual full dispersion of the masterbatch in the EPDM matrix is listed in Table 1 and shows that the masterbatches according to the present invention disperse much faster in EPDM than the masterbatches prepared on a two roll mill.

TABLE 1

|  | Inv. 1 | Inv. 2 | Comp. 1 | Perkadox® BC-40MB-GR | Perkadox® 14-40MB-GR-S |
|---|---|---|---|---|---|
| Mixing technology | Extruder | Extruder | Two roll mill | Two roll mill | Two roll mill |
| Perkadox® BC | 40 |  | 40 | 40 |  |
| Perkadox® 14S |  | 40 |  |  | 40 |
| Calcium carbonate | 20 | 20 | 20 | 20 | 20 |
| Silica | 10 | 10 | 10 | 10 | 10 |
| POE | 30 | 30 | 30 |  |  |
| EPM |  |  |  | 30 | 30 |
| Mixing time (min:sec) | 1:53 | 1:47 | 2:00 | 2:55 | 3:13 |

The crosslink behaviour of the masterbatches was tested in a rheometer using the materials, amounts, and conditions listed in Table 2. It shows that the crosslink density and mechanical properties obtained by using the masterbatches according to invention are comparable to those obtained using the commercial masterbatches.

TABLE 2

| EPDM | 100 | 100 | 100 | 100 |
|---|---|---|---|---|
| Carbon Black (N-550) | 70 | 70 | 70 | 70 |
| Carbon black (N-772) | 70 | 70 | 70 | 70 |
| Sunpar 550 oil | 50 | 50 | 50 | 50 |
| Perkadox® BC inventive masterbatch | 6.1 |  |  |  |
| Perkadox® 14 inventive masterbatch |  | 3.8 |  |  |
| Perkadox® BC-40-MB-GR |  |  | 6.1 |  |
| Perkadox® 14-40-MB-GR |  |  |  | 3.8 |
| Rheometer ° C. | 170 | 175 | 170 | 175 |
| ts2 (min) | 0.8 | 0.9 | 0.8 | 0.9 |
| t5 (min) | 0.4 | 0.4 | 0.4 | 0.4 |
| t50 (min) | 1.9 | 2.2 | 1.9 | 2.2 |
| t90 (min) | 6.4 | 7.2 | 6.0 | 7.2 |
| ML (Nm) | 0.2 | 0.3 | 0.3 | 0.3 |
| MH (Nm) | 1.3 | 1.3 | 1.3 | 1.3 |
| delta S (Nm) | 1.1 | 1.0 | 1.0 | 1.1 |
| Tensile Strength (N/mm²) | 12.7 | 12.3 | 12.1 | 12.3 |
| Elongation at break (%) | 326 | 345 | 321 | 344 |
| M50 (N/mm²) | 2.1 | 2.1 | 2.3 | 2.2 |

TABLE 2-continued

| | | | | |
|---|---|---|---|---|
| M100 (N/mm$^2$) | 4.2 | 4.2 | 4.6 | 4.3 |
| M200 (N/mm$^2$) | 9.3 | 9.2 | 9.5 | 9.2 |
| M300 (N/mm$^2$) | 12.5 | 11.9 | 12.0 | 11.8 |
| IRHD Hardness | 74.2 | 75.5 | 73.4 | 75.3 |
| Crescent Tear strength (kN/m) | 34.7 | 35.7 | 35.7 | 37.9 |

Example 2

Example 1 was repeated, except for using different copolymers:
Engage™ HM7387 ex-Dow (a POE copolymer of ethylene and 1-butene)
Elvax® 360A ex-DuPont (an ethylene vinyl acetate copolymer).
All masterbatches of this example were prepared in an extruder.
The results are displayed in Table 3.

TABLE 3

| | Inv. 3 | Comp. 2 | Comp. 3 | Inv. 4 | Inv. 5 | Comp. 4 |
|---|---|---|---|---|---|---|
| Perkadox ® BC | 40 | 40 | 60 | 40 | | 40 |
| Perkadox ® 14S | | | | | 40 | |
| Calcium carbonate | 20 | 20 | | 10 | 10 | |
| Silica | 10 | | | 20 | 20 | |
| POE | 30 | 40 | 40 | | | |
| EVA | | | | 30 | 30 | 60 |
| Observations | | Chopping difficult | Chopping difficult | | | Very wet, poor mixing |
| Mixing time (min:sec) | 1:10 | 1:15 | 1:15 | 0:45 | 0:30 | 2:40 |

Experiments Inv. 3 and Comp. 2 and 3 and Experiments Inv. 4 and Comp. 4 show that the fillers, and especially the type 1 fillers are preferred for obtaining suitable extrudates.

The invention claimed is:

1. Peroxide masterbatch comprising:
   15-55 wt % of one or more organic peroxides,
   15-45 wt % of one or more copolymers of at least two different monomers, the first monomer being ethylene or propylene, the second monomer being a vinyl monomer comprising at least four carbon atoms and optionally heteroatoms,
   6-70 wt % of at least two filler types—filler type 1 and filler type 2—each having a different BET surface area:
   (i) filler type 1 being present in the masterbatch in a concentration of 3-30 wt % and having a BET surface area of more than 100 m$^2$/g;
   (ii) filler type 2 being present in the masterbatch in a concentration of 3-40 wt % and having a BET surface area of 100 m$^2$/g or less;
   wherein the masterbatch has the form of extrudates.

2. Peroxide masterbatch according to claim 1 comprising 30-52 wt % of one or more peroxides.

3. Peroxide masterbatch according to claim 1 comprising an organic peroxide is-selected from the group consisting of dicumyl peroxide, di(tert-butylperoxyisopropyl)benzene, 1,1-di(tert-butylperoxy)-3,3,5-tri-methylcyclohexane, butyl-4,4-di(tert-butylperoxy)valerate, 2,5-dimethyl-2,5-di(tert-butylperoxy)hexane, and tert-butyl peroxy-3,5,5-trimethylhexanoate.

4. Peroxide masterbatch according to claim 1 comprising a copolymer i& selected from ethylene-vinyl acetate copolymers, copolymers of (i) ethylene or propylene and (ii) 1-butene, 1-hexene, and/or 1-octene, copolymers of ethylene and acrylates, styrene ethylene butylene hydrogenated copolymers, and styrene ethylene propylene hydrogenated copolymers.

5. Peroxide masterbatch according to claim 4 wherein the copolymer comprises a copolymer of (i) ethylene or propylene and (ii) 1-butene and/or 1-octene.

6. Peroxide masterbatch according to claim 4 wherein the copolymer is an ethylene-vinyl acetate copolymer.

7. Peroxide masterbatch according to claim 1 comprising 3-15 wt % of filler type 1 and 10-30 wt % of filler type 2.

8. Peroxide masterbatch according to claim 1 wherein filler type 1 has a BET surface area of more than 150 m$^2$/g.

9. Peroxide masterbatch according to claim 1 wherein filler type 1 is selected from carbon black, silica, and combinations thereof.

10. Peroxide masterbatch according to claim 1 wherein filler type 2 has a BET surface area below 10 m$^2$/g.

11. Peroxide masterbatch according to claim 1 wherein filler type 2 is selected from calcium carbonate, barium sulphate, clay, and combinations thereof.

12. Process for the preparation of a peroxide masterbatch of claim 1 wherein the one or more organic peroxides, granules or pellets of the one or more copolymers, and the at least two filler types are added to an extruder and extruded at a temperature in the range 50-95° C.

13. Process according to claim 11 wherein the extrusion is conducted at a temperature in the range 70-85° C.

14. Process for crosslinking of an elastomer comprising the step of dispersing the peroxide masterbatch according to claim 1 in the elastomer to be crosslinked.

15. The process according to claim 4, wherein the elastomer comprises EPM.

16. The process according to claim 4, wherein the elastomer comprises EPDM.

* * * * *